July 6, 1965  B. F. NICHOLLS  3,192,568
INFLATABLE ARTICLE AND METHOD AND APPARATUS FOR MAKING SAME
Filed Feb. 21, 1961
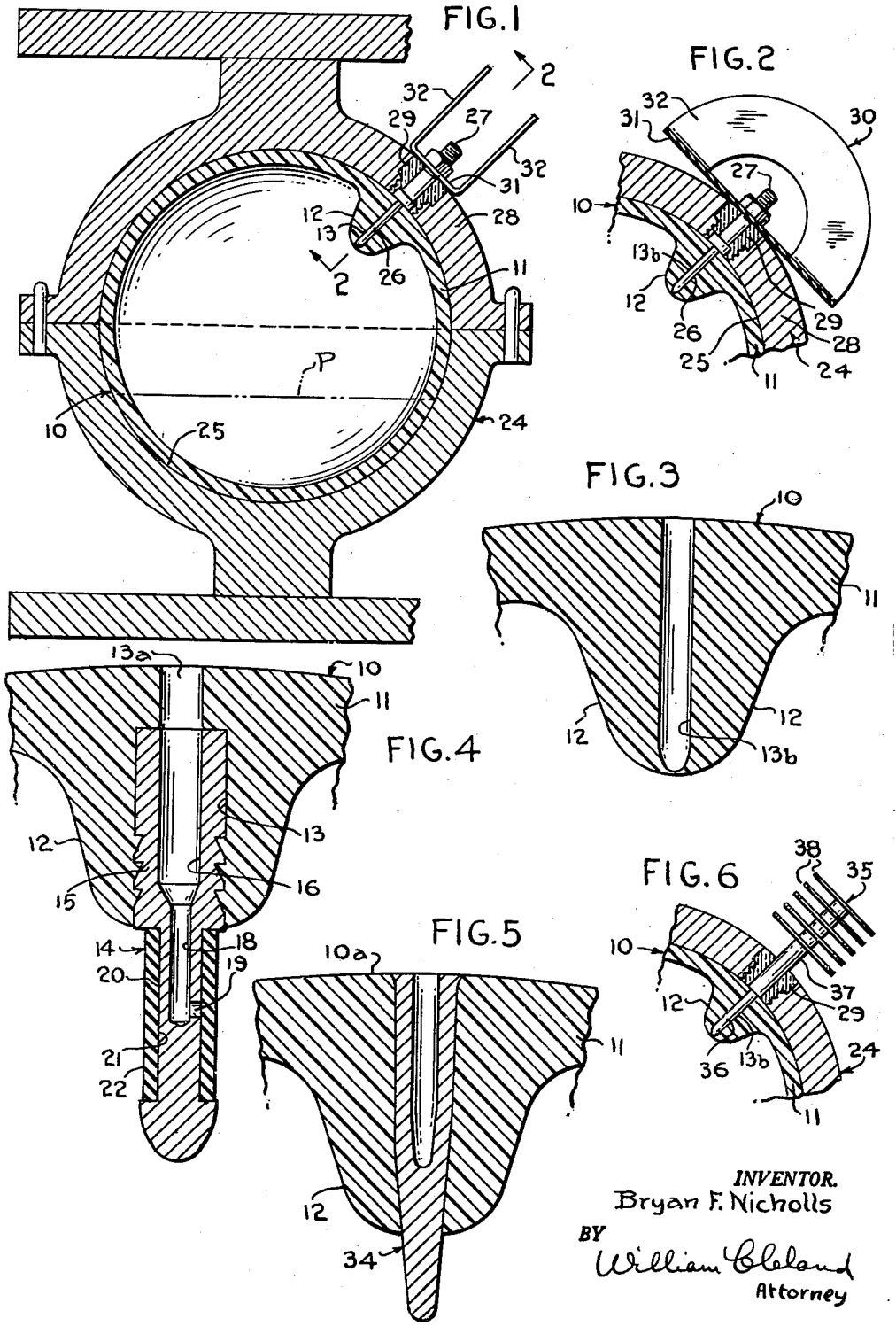
INVENTOR.
Bryan F. Nicholls
BY William Cleland
Attorney

United States Patent Office 3,192,568
Patented July 6, 1965

3,192,568
INFLATABLE ARTICLE AND METHOD AND
APPARATUS FOR MAKING SAME
Bryan F. Nicholls, 14 Harlestone Road,
Northampton, England
Filed Feb. 21, 1961, Ser. No. 90,836
9 Claims. (Cl. 18—39)

This invention relates to inflatable playballs or like articles having inflation valve means therein, and to methods and apparatus for making the same.

Previously, in the manufacture of inflatable articles from polyvinyl chloride plastisols, it was difficult to provide a satisfactory valve supporting housing. By one prior method, for example, in order to provide a suitably sturdy valve housing, it was necessary to affix a pre-fused, polyvinyl chloride insert on a pin in the mold cavity prior article forming steps, so that the insert would be heat-bonded to the article wall. Accordingly, the method required preforming the insert and manual insertion of the same in the mold.

One object of the present invention is to provide an improved method and apparatus for casting hollow inflatable articles from plastic resin material, such as polyvinyl chloride, by which a sturdy inflation-valve housing is formed integrally with the wall of the article, and thereby eliminating the necessity for providing a preformed insert, as well as the step of positioning the insert in the mold prior to the article-forming steps.

Another object of the invention is to provide a seamless polyvinyl chloride ball or like inflatable article having a sturdy, substantially solid valve housing integrally formed in the wall of the article solely by deposition of the material within the mold during the casting method.

These and other objects of the invention will be manifest from the following brief description and the accompanying drawings.

This application corresponds to application No. 9,086/60, filed in Great Britain on March 15, 1960.

FIGURE 1 is a fragmentary cross-section illustrating an article-forming cavity mold, in closed condition, with a playball fully formed therein by the method of the invention.

FIGURE 2 is a greatly enlarged fragmentary cross-section taken substantially on the line 2—2 of FIGURE 1, and particularly illustrating a heat-gathering device for forming a valve-housing in the ball.

FIGURE 3 is a fragmentary cross-section, corresponding to FIGURE 2, illustrating the valve-housing after removal of the ball from the mold.

FIGURE 4 is a view like FIGURE 3, but illustrating the ball with an inflation valve unit affixed in the valve housing.

FIGURE 5 is a view corresponding to FIGURE 4, but illustrating use of a plug in the valve housing to seal against loss of inflation air from the article.

FIGURE 6 is a view corresponding to FIGURE 2, illustrating a modified form of heat-gathering unit in the mold.

Referring particularly to FIGURE 4, there is illustrated an enlarged fragmentary cross-section of an inflated playball 10 of synthetic resin plastic material, such as polyvinyl chloride. Ball 10 includes a seamless, spherical body wall 11, having a sturdy, substantially solid valve housing or protuberance 12 integrally formed of the same material on the inner surface of wall 11.

The housing 12 has a passage 13 extending radially therethrough, within which suitable inflation valve means 14 is securely retained in air sealing relationship. Valve means 14 may include a rigid body or stem 15 of metal or hard plastic material, the stem being yieldingly gripped by the thick wall of the vinyl housing 12.

The outer end of stem 15 is shown spaced from the outer surface of the wall 11, to have an aperture 13a in wall 11 communicating with an elongated passage 16 in the stem, for inward reception of a suitable inflation tool or needle (not shown). Passage 16 has a reduced inner extension 18, from which a small aperture 19 extends to a longitudinally centered portion of an annular groove 20 defining a smooth cylindrical surface 21. An air impervious cylindrical rubber tube 22 is yieldingly expanded onto said cylindrical surface, normally to seal the aperture 19 against outward escape of inflation air from the ball. The portion of stem 15 which includes the groove 20 extends freely inwardly of the inner end of the housing 12.

For inflating the ball 10, inflation air from a suitable source is supplied through an inflation tool or needle received in passage 16 to expand the rubber tube 22, thereby to allow the inflation air to enter the ball. When the ball is inflated to predetermined extent, and the tool is withdrawn, the internal pressure tends to hold rubber tube 22 tightly contracted in air sealing relation against the cylindrical surface 21 to prevent escape of inflation air through the valve unit 14.

FIGURE 3 illustrates the fully formed valve housing of FIGURE 4, but in a condition thereof prior to mounting the valve unit 14 in the same, and FIGURES 1 and 2 illustrate a sectional cavity mold 24 for rotationally casting the ball by the method of the invention. The mold has an article-forming cavity 25 provided with a radially inwardly extending metal pin 26, which is usually required to be of relatively small diameter, as for example $\frac{1}{16}$ inch, to form a passage or bore 13$b$ of coresponding relatively small diameter. In accordance with prior art practices, however, in which the molds are generally of aluminum alloy and the pins are generally of steel, an ordinary steel pin of such small diameter would, by various methods used for rotationally casting balls from polyvinyl chloride plastisol, in the presence of heat, produce only a very thin deposit on the pin, which in most instances would be unsatisfactory for retaining or supporting the valve unit 14. The present invention contemplates provision of a method and apparatus by which this problem is solved, namely by providing a thick-walled deposit on the pin 26 to form the solid housing 12.

To this end, the pin 26 utilized in the present invention, first of all, is of material having a high coefficient of heat transmission, such as copper or silver. The pin 26 may have an integral portion 27 extending outwardly through the mold wall 28 to receive or gather external heat, such as by exposure to open steam or heated air surrounding the mold, to transmit a maximum amount of heat inwardly along the pin at a rapid rate as compared with heat transmitted through the usual aluminum wall 28 of the mold. To prevent loss of heat by transmission therefrom the pin 26 to the mold wall 28, the pin may be fixedly supported in a plug 29 of heat insulating material, such as asbestos, threaded or otherwise affixed in the mold wall. The insulating plug 29 may be eliminated by substitution of an insulating layer of lacquer between the pin and the mold wall.

For increasing the supply of external heat to the pin 26, a heat-gathering member 30 is provided on pin extension 27. Member 30 may be a disc of thin sheet copper, formed U-shaped to define a cross-piece 31 suitably affixed on said extension, and connecting parallel plates or vanes 32, 32. By thus exposing a substantial surface area of the heat conductive metal to the external heat, a maximum amount of heat is transmitted to pin 26.

According to the method of the invention, a predetermined quantity of fluid plastic resin material, such as polyvinyl chloride plastisol P, is placed in the lower half of the mold 24. The mold is then closed and rotated about a plurality of planes for a predetermined length of time, under carefully controlled conditions, to heat the mold and the plastisol, and thereby to form a ball 10 of predeterminately uniform wall thickness, which first gels and then fuses in well known manner.

During the article-forming process, and due to the increased heat concentration in the pin 26, the fluid plastisol is likewise deposited to substantial thickness about the pin 26, to form a fused solid valve housing 12, integral with the wall 11 of the ball. The mean thickness of the deposit on pin 26, in actual practice, has been found to be as much as the thickness of the wall 11 of the ball, or even thicker in some instances. In any event the housing is sufficiently strong to retain the valve unit, and is thickest adjacent the wall 11, due to a natural tendency of the plastisol to form a large radius at the juncture of the housing 12 and wall 11. For subsequent easy installation of valve unit 14 (referred to above) the inner end of pin 26 may be rounded or otherwise suitably shaped so that there will be little or no fused plastisol sealing the inner end of the passage 13b (see FIGURES 1, 2 and 3).

At this stage of the method, upon allowing the ball 10 to cool to a requisite degree at which it will have attained maximum strength and other physical properties, the mold may be opened for removal of the ball.

The ball 10 thus removed from the mold (see FIGURE 3) will have a narrow cylindrical passage 13b, approximating one-sixteenth inch in diameter for example, extending radially through wall 11 and the housing 12. By means of a suitable tool an operator may now forcibly insert the rigid inflation means, such as a valve unit 14, through passage 13b to the relative position thereof shown in FIGURE 4, and as described above, in which the outer serrated portion of the rigid valve stem 15 is firmly anchored to the housing in air-sealing relationship by contraction of the elastic material of the housing. For attaining strong adhesion of the elastic material about the stem, the valve-inserting step may be satisfactorily accomplished soon after removal of the ball from the mold, while the housing is still warm and somewhat soft and pliable. Upon continued cooling of the ball, the housing 12 will contract further into strong air-sealing embrace about the valve stem.

Balls 10 or like inflatable articles may be produced by other forming or casting methods, such as by slush molding, to have a substantially solid valve housing 12 integrally formed on wall 11.

FIGURE 5 shows a ball 10a, which is in all respects like ball 10 of FIGURE 4 except that a rigid air-sealing plug 34 is anchored or affixed in the valve housing 12 in place of valve unit 14.

In FIGURE 6 there is illustrated mold structure corresponding to the structure shown in FIGURES 1 and 2, but in which a modified form of heat-gathering unit 35 is utilized. In unit 35 the valve housing pin 36 has an outward extenison 37, on which may be affixed a plurality of thin discs or plates 38, 38, of copper or other material having a higher coefficient of heat transmission than the material of the mold. For the purpose previously described, the plates are spaced in parallelism to expose maximum surface area to the external heat of the mold.

In the modification of FIGURES 5 and 6, like parts with respect to FIGURES 1 to 4 are otherwise designated by like numerals.

As previously mentioned in connection with the art of making inflatable playballs of plastic resin material, it was heretofore not possible to provide suitably sturdy, one-piece inflation valve housings. In particular, it was not possible by prior art rotational casting methods to form an integral, one-piece housing which would embrace a valve unit with sufficient inherent resiliency and power to anchor the valve unit against accidental removal or displacement under normal conditions of use or abuse of the ball. An inward protuberance from the wall of the article forming mold could only produce a relatively thin skin coat of resin plastic during the rotary casting procedure, and the resin deposit was necessarily of short extent and small sizes and, therefore, incapable of properly retaining an air-sealing valve unit or plug. Nicholls et al. prior Patent No. 3,100,641 overcame this difficulty by rotational casting a thin coating of vinyl plastic about a prefused vinyl insert, but this method involved relatively costly steps for mounting the prefused insert on a protrusion within the mold cavity prior to the rotational casting operation.

In accordance with the several modifications of the invention described above, it is readily apparent that the heaviness or size of the housing 12 about the pin 26 (or pin 36) is not necessarily dependent upon the thickness of the article wall, but rather depends upon the rate of heat transmission or the intensity of the heat transmitted to the end of said pin. Accordingly, while FIGURES 1 to 6 show housings 12 of substantially heavy proportions, the size of the housings may be controlled to provide heavier or lighter housings, as by allowing more or less heat to be transferred toward the end of the pin, or by varying the materials of the pin and/or the external heat-gathering means 26, 30, 35 and 37. As an example, with use of a copper or a silver pin 36 and an external extrusion 27, sufficient heat may be concentrated along the pin 26 to deposit a substantial thickness of fluid plastisol about the same, thereby ultimately to provide a housing of sufficient elastic body and strength permanently to retain a valve stem or plug anchored in air-sealing relationship within the elastic body 12 under all conditions of normal use or abuse of the finished article.

Other modifications of the invention may be resorted to without departing from the spirit thereof or the scope of the appended claims.

What is claimed is:

1. Apparatus for forming hollow inflatable seamless articles by deposition of synthetic resin plastic material in the presence of external heat, comprising: a sectional mold having a mold wall defining an article-forming cavity; said mold having a protrusion extending freely inwardly of the article-forming cavity surface; said protrusion having an integral extension passing through and beyond the mold wall presenting a heat-gathering portion substantially within the sphere of maximum temperature of said external heat to which the mold wall is exposed; said protrusion, integral extension, and exposed heat-gathering portion characteristically having a higher coefficient of heat transmission than the mold wall, for depositing an apertured housing of plastic material about the protrusion and integral with a simultaneously deposited article wall, whereby the deposited housing will be of sufficient body and elastic strength to embrace and anchor an air-sealing device within the aperture of the housing under conditions of normal use and abuse of the inflated finished article.

2. Apparatus as set forth in claim 1, at least said protrusion being of metallic substance possessing a high coefficient of thermal conductivity on the order of silver and copper.

3. Apparatus as set forth in claim 2, wherein said integral extension has thereon heat-gathering means including freely exposed surface portions of substantially broad lateral area.

4. Apparatus as set forth in claim 3, wherein said heat-gathering means includes at least one freely exposed, relatively thin plate of heat-conductive material.

5. Apparatus as set forth in claim 1, wherein said heat-gathering portion includes at least one relatively thin plate of heat-conductive material.

6. Apparatus as set forth in claim 1, wherein said heat-gathering portion includes a plurality of spaced, freely exposed, heat-gathering elements for exposure to said external heat.

7. Apparatus for rotational casting of hollow inflatable articles from plastic resin material in the presence of heat, comprising a sectional cavity mold having a mold wall defining an article-forming cavity and having an inward protrusion from the mold wall, and heat-gathering means for providing a higher rate of heat transmission in said protrusion than in the mold wall, whereby in rotationally casting the article an integral relatively heavy thickness of the plastic material is formed on said protrusion commensurate with said higher rate of heat transmission therein, the part of said protrusion passing through the mold wall having heat insulating means between the same and the mold wall.

8. Apparatus for rotational casting of hollow inflatable articles from plastic resin material in the presence of heat, comprising a sectional cavity mold having a mold wall defining an article-forming cavity and having an inward protrusion from the mold wall, and heat-gathering means for providing a higher rate of heat transmission in said protrusion than in the mold wall, whereby in rotationally casting the article an integral relatively heavy thickness of the plastic material is formed on said protrusion commensurate with said higher rate of heat transmission therein, said heat-transmitting means including a heat transmitting extension of the protrusion which is provided with at least one heat gathering plate for exposure to external heat applied to the mold, means being provided for heat insulating said heat transmitting means from the mold wall.

9. Apparatus for forming hollow inflatable seamless articles by rotary casting polyvinyl chloride plastic material in the presence of external heat, comprising: a sectional mold having a mold wall defining an article-forming cavity; said mold having a protrusion extending freely inwardly of the article-forming cavity surface; said protrusion being of metallic substance possessing a high coefficient of thermal conductivity on the order of that of silver and copper; said protrusion having an extension through the mold wall including a heat-gathering portion presented to absorb external heat from the source thereof to which the mold wall is exposed; whereby said protrusion, integral extension, and heat-gathering portion will have a sufficiently higher coefficient of heat transmission than the mold wall to transfer heat inwardly along said protrusion at a correspondingly high rate of heat transmission than that of the mold wall for rotary casting an apertured housing of plastic material about the protrusion and integral with a simultaneously rotary cast seamless article wall, and whereby the resultantly formed seamless housing will be of sufficient body and elastic strength to embrace and anchor an air-sealing device within the aperture of the housing under conditions of normal use and abuse of the inflated finished article.

References Cited by the Examiner

UNITED STATES PATENTS

| | | | |
|---|---|---|---|
| 1,498,335 | 6/24 | Hambach | 18—42 |
| 2,477,899 | 8/49 | Rempel | 18—58.3 |
| 2,730,765 | 1/56 | Crafton et al. | 18—39 |
| 2,760,775 | 8/56 | Tipton | 273—58 |
| 2,808,967 | 10/57 | Miller | 18—58.3 X |
| 2,812,551 | 11/57 | Chupa | 18—58 |
| 2,935,320 | 5/60 | Chupa | 273—58 |
| 2,959,820 | 11/60 | Miller et al. | 18—58.3 |
| 3,008,190 | 11/61 | Mesinger | 18—58.3 X |

FOREIGN PATENTS

| | | |
|---|---|---|
| 563,042 | 9/58 | Canada. |
| 836,758 | 6/60 | Great Britain. |

MICHAEL V. BRINDISI, *Primary Examiner.*

RICHARD C. PINKHAM, *Examiner.*